(12) United States Patent
Abe (10) Patent No.: US 8,370,891 B2
(45) Date of Patent: Feb. 5, 2013

(54) COMMUNICATION APPARATUS AND CONTROL METHOD

(75) Inventor: Isao Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/458,829

(22) Filed: Apr. 27, 2012

(65) Prior Publication Data

US 2012/0212409 A1  Aug. 23, 2012

Related U.S. Application Data

(63) Continuation of application No. 12/493,867, filed on Jun. 29, 2009, now Pat. No. 8,189,118.

(30) Foreign Application Priority Data

Jun. 30, 2008 (JP) .................................. 2008-171733

(51) Int. Cl.
*H04N 7/173* (2011.01)
*H04N 7/16* (2011.01)

(52) U.S. Cl. .................. 725/133; 725/141; 725/153

(58) Field of Classification Search .................. 345/156; 725/133, 141, 153
See application file for complete search history.

(56) References Cited

U.S. PATENT DOCUMENTS

| 6,088,724 A * | 7/2000 | Hasegawa ..................... 709/219 |
| 2009/0116379 A1* | 5/2009 | Rahman ........................ 370/229 |

FOREIGN PATENT DOCUMENTS

| JP | 10-022999 A | 1/1998 |
| JP | 2000-059760 A | 2/2000 |
| JP | 2006-333101 A | 12/2006 |

* cited by examiner

*Primary Examiner* — Hunter B Lonsberry
(74) *Attorney, Agent, or Firm* — Canon USA Inc IP Division (57) ABSTRACT

A communication apparatus includes a display unit, a communication unit, and a control unit. The display unit displays video data. The communication unit communicates with an external apparatus. The control unit controls the communication apparatus in accordance with a command received by the communication unit. If the display unit is in a mute state and the communication unit is sending the external apparatus the data for placing the external apparatus in a mute state, the control unit determines not to control the communication apparatus in accordance with the command.

35 Claims, 5 Drawing Sheets

COMMUNICATION APPARATUS AND CONTROL METHOD

CROSS-REFERENCE TO RELATED APPLICATIONS

The present application is a continuation of U.S. patent application Ser. No. 12/493,867, filed Jun. 29, 2009, entitled "COMMUNICATION APPARATUS AND CONTROL METHOD", the content of which is expressly incorporated by reference herein in its entirety. Further, the present application claims priority from Japanese Patent Application No. 2008-171733 filed Jun. 30, 2008, which is also hereby incorporated by reference herein in its entirety.

BACKGROUND OF THE INVENTION

1. Field of the Invention

The present invention relates to a communication apparatus used for sending video data to an external apparatus and a method of controlling the communication apparatus.

2. Description of the Related Art

In conventional communication systems, there are such systems that include a communication apparatus and an external display apparatus which are connected via a digital interface, and the communication apparatus is remote controlled by a remote control unit of the external display apparatus.

In a communication system discussed in Japanese Patent Application Laid-Open No. 2006-41584, by remote controlling a communication apparatus using a remote control unit of an external display apparatus, a user can view video data, reproduced from a recording medium, on the external display apparatus.

Generally, a distorted video image is displayed when power of a communication apparatus is turned on. In order to prevent such distorted image from being displayed on a monitor, a video image displayed on a monitor of a conventional communication apparatus is muted for a predetermined period of time. Further, when an operation mode of the communication apparatus is changed, a video image displayed on the monitor is also muted for a predetermined period of time.

Even when the video image displayed on the monitor of the communication apparatus is muted, if the remote control unit of the external display apparatus is operated, the communication apparatus receives a control command from the external display apparatus. If the command sent from the external display apparatus is executed in such a period, since the video displayed on the monitor of the communication apparatus is muted, the user is unable to determine whether the control command sent from the external display apparatus is executed.

If the user thinks that the communication apparatus is not executing the control command sent from the external display apparatus even if the communication apparatus is actually executing the control command, the user may operate the remote control unit again. If the user operates the remote control unit again, the operating state of the communication apparatus will be different from the state the user intended it to be, and an operational error is more likely to occur. As a result, an unexpected error may occur and the user may be confused.

SUMMARY OF THE INVENTION

The present invention is directed to prevent an operational error of a user and improve operability.

According to an aspect of the present invention, a communication apparatus includes a display unit that displays video data, a communication unit that communicates with an external apparatus, and a control unit that controls the communication apparatus in accordance with a command received by the communication unit, wherein the control unit determines not to control the communication apparatus in accordance with the command, if the display unit is in a mute state and the communication unit is sending the external apparatus data for placing the external apparatus in a mute state.

According to an aspect of the present invention, a method of controlling a communication apparatus, the communication apparatus including a display unit that displays video data, and a communication unit that communicates with an external apparatus, the method comprising: controlling the communication apparatus in accordance with a command received by the communication unit, and determining not to control the communication apparatus in accordance with the command, if the display unit is in a mute state and the communication unit is sending the external apparatus data for placing the external apparatus in a mute state.

Further features and aspects of the present invention will become apparent from the following description of exemplary embodiments with reference to the attached drawings.

DESCRIPTION OF THE EMBODIMENTS

Various exemplary embodiments, features, and aspects of the present invention will now be described in detail below with reference to the attached drawings.

First Embodiment

Figure 1:
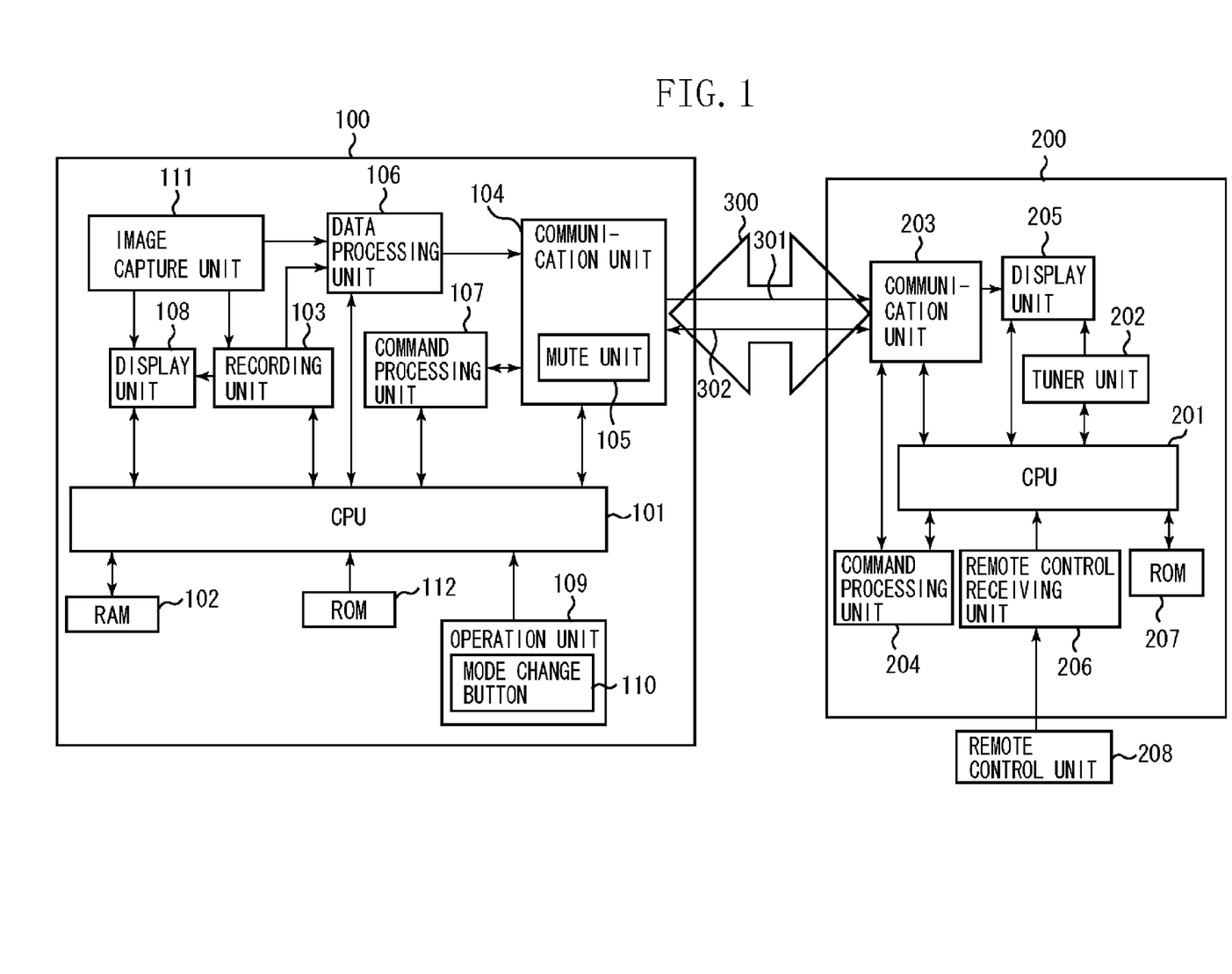
FIG. 1 is a block diagram illustrating an example of a schematic configuration of a communication system according to a first and a second exemplary embodiments of the present invention.
Figure 2:
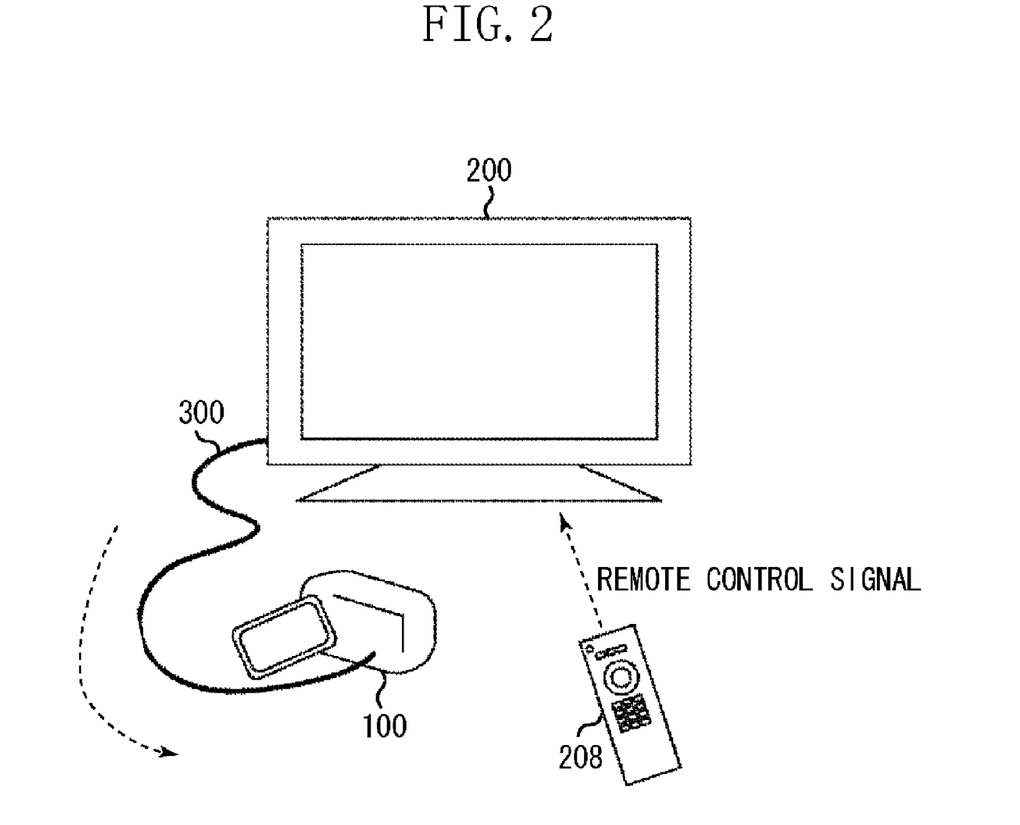
FIG. 2 illustrates an example of the communication system according to the first and the second exemplary embodiments of the present invention.

FIG. 1 is a block diagram illustrating an example of a schematic configuration of a communication system according to a first exemplary embodiment of the present invention. FIG. 2 illustrates an example of the communication system according to the first exemplary embodiment of the present invention.

As illustrated in FIGS. 1 and 2, the communication system according to the first exemplary embodiment includes a communication apparatus 100, a connection cable 300, an external apparatus 200, and a remote control unit 208. The communication apparatus 100 and the external apparatus 200 are connected via the connection cable 300. The external apparatus 200 and the remote control unit 208 are connected via wireless communication.

The communication apparatus 100 is a video source that can send video data, audio data, and ancillary data to the external apparatus 200 via the connection cable 300. The external apparatus 200 is an external display apparatus that displays the video data sent from the communication apparatus 100 on a display device, and outputs the audio data sent from the communication apparatus 100 from a speaker. The communication apparatus 100 and the external apparatus 200 can bidirectionally send various control commands via the connection cable 300.

The remote control unit 208 is a user interface used for operating the communication apparatus 100 and the external apparatus 200. The remote control unit 208 is configured such that it is capable of communicating with the external apparatus 200 via wireless communication but incapable of communicating with the communication apparatus 100 via wireless communication. The external apparatus 200 receives a remote control signal sent from the remote control unit 208 and analyzes the received remote control signal.

If the remote control signal received by the external apparatus 200 is a signal for controlling the external apparatus 200, the external apparatus 200 is controlled in accordance with the received remote control signal. If the received remote control signal is a signal for controlling the communication apparatus 100, the external apparatus 200 generates a control command that corresponds to the received remote control signal, and sends the generated control command to the communication apparatus 100 via the connection cable 300. In this way, the user can directly remote control the external apparatus 200 using the remote control unit 208. Further, the user can indirectly remote control the communication apparatus 100 using the remote control unit 208.

According to the first exemplary embodiment, a video camera is used as an example of the communication apparatus 100 and a television receiving apparatus (hereinafter referred to as a "television") is used as an example of the external apparatus 200. Further, according to the first exemplary embodiment, a connection cable that conforms to the High-Definition Multimedia Interface (HDMI)® standard is used as an example of the connection cable 300. The connection cable that conforms to the HDMI standard is hereinafter referred to as the "HDMI cable".

Next, the HDMI cable 300 will be described. The HDMI cable 300 includes a Transition Minimized Differential Signaling (TMDS)® line 301 and a Consumer Electronics Control (CEC) line 302. Further, the HDMI cable 300 includes a Hot Plug Detect (HPD) line, a Display Data Channel (DDC) line, and a power supply line.

The TMDS line 301 is a transmission line used for transmitting the video data, the audio data, and the ancillary data from the video camera 100 to the television 200. The TMDS line 301 includes TMDS channel 0, TMDS channel 1, TMDS channel 2, and TMDS clock channel. The CEC line 302 is a transmission line used for bidirectionally transmitting various control commands between the video camera 100 and the television 200. The HPD line is a transmission line used for transmitting a HPD signal from the television 200 to the video camera 100. The DDC line is a transmission line used for transmitting Extended Display Identification Data (EDID) of the television 200 from the television 200 to the video camera 100. The EDID includes information on capability such as display capability of the television 200. The power supply line is a line that supplies power from the video camera 100 to the television 200.

The video camera 100 operates as a HDMI source defined by the HDMI standard. The television 200 operates as a HDMI sink defined by the HDMI standard. Further, the video camera 100 and the television 200 are HDMI devices that conform to the CEC standard. The CEC is a control protocol defined by the HDMI standard. A control command sent between the video camera 100 and the television 200 via the CEC line 302 will hereinafter be referred to as a "CEC command".

The television 200 can control the video camera 100 by sending a CEC command used for controlling the video camera 100 to the video camera 100 via the CEC line 302. The video camera 100 can also control the television 200 by sending a CEC command used for controlling the television 200 to the television 200 via the CEC line 302. The CEC commands used for controlling the video camera 100 is, for example, a power on command, a power off command, a playback command, or a stop command. Further, the CEC command is, for example, a pause command, a fast forward command, a rewind command, a record command, a record pause command, a menu on command, or a menu off command.

The connection cable 300 is not limited to the HDMI cable. The connection cable 300 can be any connection cable other than the HDMI cable so long as it is a connection cable that separately includes a line that transmits the video data, the audio data, and the ancillary data and a line that bidirectionally transmits various control commands between the communication apparatus 100 and the external apparatus 200.

Next, an example of a configuration of the video camera 100 will be described. As illustrated in FIG. 1, the video camera 100 includes a central processing unit (CPU) 101, a random access memory (RAM) 102, a recording unit 103, a communication unit 104, a data processing unit 106, a command processing unit 107, a display unit 108, an operation unit 109, an image capture unit 111, and a read only memory (ROM) 112.

The video camera 100 includes operation modes such as an image capture mode and a playback mode. If the video camera 100 is in the image capture mode, an image of an object can be captured by the video camera 100 and the captured image (either a moving image or a still image) can be recorded in a recording medium. If the video camera 100 is in the playback mode, a user selected image (either a moving image or a still image) can be reproduced from the recording medium.

The CPU 101 controls the operation of the video camera 100 in accordance with a computer executable program stored in the ROM 112.

The RAM 102 is a memory that functions as a work area of the CPU 101 and is also used as a memory for storing various values, data, and information used by the CPU 101. The CPU 101 acquires information on the television 200 from the television 200 via the HDMI cable 300, and stores the acquired information in the RAM 102. The information stored in the RAM 102 is, for example, a globally unique identifier (GUID), which is a unique identifier of the television 200 and the EDID of the television 200. The work area of the CPU 101 is not limited to the RAM 102 and an external storage unit such as a hard disk apparatus can also be used.

If the video camera 100 is in the image capture mode, the image capture unit 111 senses an object and generates video data from an optical image of the object. The video data generated by the image capture unit 111 is supplied to the recording unit 103, the display unit 108, and the data processing unit 106. Audio data generated by a microphone unit (not shown) will also be supplied to the recording unit 103 and the data processing unit 106.

If the video camera 100 is in the image capture mode, the recording unit 103 can record the video data generated by the image capture unit 111 and the audio data generated by the microphone unit (not shown) in the recording medium.

Further, if the video camera 100 is in the playback mode, the recording unit 103 can reproduce the video data or the audio data selected by the user from the recording medium. The video data reproduced from the recording medium is supplied to the display unit 108 and the data processing unit 106. On the other hand, the audio data reproduced from the recording medium is supplied to the data processing unit 106 and a speaker unit (not shown).

The recording medium used by the recording unit 103 can be either a recording medium integrated in the video camera 100 or a recording medium removable from the video camera 100.

The communication unit 104 includes a HDMI terminal used for connecting the HDMI cable 300. If the video camera 100 is in the image capture mode, the communication unit 104 transmits the video data generated by the image capture unit 111, the audio data generated by the microphone unit (not shown), and the ancillary data generated by the CPU 101 to the television 200 via the TMDS line 301. If the video camera 100 is in the playback mode, the communication unit 104 transmits the video data and the audio data which the recording unit 103 reproduced from the recording medium, and the ancillary data generated by the CPU 101 to the television 200 via the TMDS line 301.

Further, the communication unit 104 includes a mute unit 105. The mute unit 105 generates data used for placing the television 200 in a mute state. This data is hereinafter referred to as a mute instruction. The mute unit 105 sends the generated mute instruction to the television 200 via the TMDS line 301. The mute instruction is sent from the mute unit 105 to the television 200 via the TMDS line 301 while a second mute process, which is described below, is being executed. The mute instruction is one of ancillary data transmitted via the TMDS line 301.

Further, the communication unit 104 is capable of receiving the CEC command sent from the television 200 via the CEC line 302. If the communication unit 104 receives the CEC command from the television 200, the communication unit 104 supplies the received CEC command to the CPU 101 via the command processing unit 107.

Furthermore, the communication unit 104 can also send the CEC command for controlling the television 200 to the television 200 via the CEC line 302. The CEC command for controlling the television 200 is generated by the CPU 101 and supplied to the communication unit 104 via the command processing unit 107.

If the video camera 100 is in the image capture mode, the data processing unit 106 supplies the video data generated by the image capture unit 111, the audio data generated by the microphone unit (not shown), and the ancillary data supplied from the CPU 101 to the communication unit 104. If the video camera 100 is in the playback mode, the data processing unit 106 supplies the video data and the audio data which the recording unit 103 reproduced from the recording medium as well as the ancillary data supplied from the CPU 101 to the communication unit 104.

The display unit 108 includes a liquid crystal display. If the video camera 100 is in the image capture mode, the display unit 108 displays the video data generated by the image capture unit 111. If the video camera 100 is in the playback mode, the display unit 108 displays the video data which the recording unit 103 reproduced from the recording medium.

Further, if the video camera 100 is in the mute state, the display unit 108 displays a mute image stored in the ROM 112. According to the first exemplary embodiment, the mute image is video data that indicates that the video camera 100 is in the mute state. The mute image is, for example, black background image or blue background image. An icon or character information indicating that the video camera 100 is in the mute state can be included in the mute image. According to the first exemplary embodiment, if the display unit 108 is in the mute state, the mute image stored in the ROM 112 is displayed on the display unit 108. However, the video camera 100 can be set so that the display unit 108 displays nothing in the mute state.

The operation unit 109 is a user interface for operating the video camera 100. The operation unit 109 includes a plurality of buttons used for operating the video camera 100. An instruction given by the user is sent to the CPU 101 via the operation unit 109. Each button included in the operation unit 109 is configured by a switch or a touch panel.

The operation unit 109 includes buttons such as a power button, a start/stop button, a mode change button 110, a menu button, a + button, a − button, and a SET button.

The power button is a button used for instructing the CPU 101 that the state of the video camera 100 is to be changed to a power on state or a power off state. The power on state is a state in which necessary power can be supplied to the whole video camera 100 from a power supply (not shown) such as a battery or an AC power supply. The power off state is a state in which supply of power from the power supply to a part or whole of the video camera 100 is stopped.

The start/stop button is a button used for instructing the CPU 101 that recording of the video data which has been generated by the image capture unit 111 to the recording medium is to be started or stopped. The mode change button 110 is a button used for instructing the CPU 101 that the operation mode of the video camera 100 is to be changed to a mode such as the image capture mode or the playback mode.

The menu button is a button used for instructing the CPU 101 to display or not display a menu screen of the video camera 100. The menu screen of the video camera 100 includes a menu screen for controlling the video camera 100 and a menu screen for changing setting of the video camera 100. These menu screens are stored in the ROM 112.

In displaying the menu screen, the CPU 101 reads out the menu screen to be displayed from the ROM 112 and supplies the menu screen that has been read out to the display unit 108 and the data processing unit 106. At this time, the CPU 101 superposes a cursor on the menu screen. The display unit 108 and the data processing unit 106 superposes the menu screen sent from the CPU 101 on the video data supplied from the image capture unit 111 or the recording unit 103. In this way, a same menu screen is displayed on the display unit 108 and the television 200.

If the menu screen is to be not displayed, the CPU 101 stops the supply of the menu screen to the display unit 108 and the data processing unit 106.

The + button and the − button are used for moving the cursor on the menu screen. The SET button is used for instructing the CPU 101 to execute the item selected by the cursor. The + button, the − button, and the SET button are also used in changing the menu screens.

Further, the operation unit 109 includes a playback button, a stop button, a pause button, a fast forward button, and a rewind button. These buttons are used for instructing the CPU 101 to execute the playback, the stop, the pause, the fast forward, and the rewind operations of the video data recorded in the recording medium, respectively.

As described above, the mute image and the menu screens are stored in the ROM 112. A plurality of icons used for notifying the user of the state of the video camera 100 are also stored in the ROM 112. Further, a computer executable program used for controlling the operations of the video camera 100 is stored in the ROM 112.

It is to be noted that the communication apparatus 100 is not limited to a video camera. For example, the communication apparatus 100 can be an image capture apparatus such as a video camera, a still camera, or a camera equipped cellular phone.

Next, an example of a configuration of the television 200 will be described. As illustrated in FIG. 1, the television 200 includes a CPU 201, a tuner unit 202, a communication unit 203, a command processing unit 204, a display unit 205, a remote control receiving unit 206, and a ROM 207.

The CPU 201 controls operation of the television 200 according to a computer executable program stored in the ROM 207.

The tuner unit 202 receives an analog television broadcast, a digital television broadcast, or a cable television broadcast in accordance with the user's selection. the television broadcast received by the tuner unit 202 can be selected by the remote control unit 208. A television channel of the television broadcast received by the tuner unit 202 can also be selected by the remote control unit 208. Video data included in the analog television broadcast, the digital television broadcast, or the cable television broadcast can be displayed on the display unit 205. Further, audio data included in the analog television broadcast, the digital television broadcast, or the cable television broadcast can be output from a speaker unit (not shown).

The communication unit 203 includes a HDMI terminal used for connecting the HDMI cable 300 to the video camera 100. The communication unit 203 is capable of receiving the video data, the audio data, and the ancillary data sent from the video camera 100 via the TMDS line 301. The video data sent from the video camera 100 is displayed on the display unit 205. The audio data sent from the video camera 100 is output from the speaker unit (not shown). Further, the ancillary data sent from the video camera 100 is supplied to the CPU 201.

Further, the communication unit 203 is capable of receiving the CEC command sent from the video camera 100 via the CEC line 302. If the communication unit 203 receives the CEC command sent from the video camera 100, the communication unit 203 supplies the CEC command to the CPU 201 via the command processing unit 204.

Further, the communication unit 203 is capable of sending a CEC command for controlling the video camera 100 to the video camera 100 via the CEC line 302. The CEC command for controlling the video camera 100 is generated by the CPU 201 and supplied to the communication unit 203 via the command processing unit 204.

The communication unit 203 receives the CEC command sent from the video camera 100 via the CEC line 302. The CEC command sent from the video camera 100 is supplied from the communication unit 203 to the CPU 201 via the command processing unit 204.

The CEC command for controlling the video camera 100 is generated by the CPU 201 and supplied to the communication unit 203 via the command processing unit 204. The CEC command for controlling the video camera 100 is supplied from the command processing unit 204 to the communication unit 203 and transmitted to the video camera 100 via the CEC line 302.

The display unit 205 includes a display device such as a liquid crystal display. The display unit 205 can display video data supplied from either the tuner unit 202 or the communication unit 203. The display unit 205 can display the mute image stored in the ROM 207.

When the remote control receiving unit 206 receives a remote control signal sent from the remote control unit 208, the remote control receiving unit 206 supplies the received remote control signal to the CPU 201. In this way, the instruction given by the user is sent to the CPU 201 via the remote control unit 208 and the remote control receiving unit 206. The CPU 201 generates a CEC command that corresponds to the remote control signal sent from the remote control receiving unit 206, and supplies the generated CEC command to the communication unit 203 via the command processing unit 204. The CEC command supplied to the communication unit 203 is transmitted to the video camera 100 via the CEC line 302. In this way, the user can remote control the video camera 100 using the remote control unit 208.

As described above, the mute image and the menu screen are stored in the ROM 207. A plurality of icons used for notifying the user of the state of the television 200 and the EDID of the television 200 are also stored in the ROM 207. Further, a computer executable program used for controlling the operation of the television 200 is stored in the ROM 207.

The remote control unit 208 is a user interface for operating the video camera 100 and the television 200. The remote control unit 208 includes a plurality of buttons used for operating the video camera 100 and a plurality of buttons used for operating the television 200. Each button of the remote control unit 208 is configured by a switch or a touch panel.

The remote control unit 208 includes a first power button, a television broadcast selection button, a channel button, an external input button, a menu button, a + (plus) button, a − (minus) button, and a SET button. These buttons are used for operating the television 200.

The first power button is a button used for instructing the CPU 201 that the state of the television 200 is to be changed to a power on state or a power off state. The power on state is a state in which necessary power can be supplied to the whole television 200 from a power supply (not shown). The power off state is a state in which supply of power from the power supply to a part or whole of the television 200 is stopped.

The television broadcast selection button is used for selecting one broadcast out of the analog television broadcast, the digital television broadcast, and the cable television broadcast, and for instructing the CPU 201 to make the tuner unit 202 receive the selected television broadcast. The channel button is used for selecting a television channel of the broadcast which the tuner unit 202 receives.

The external input button is used for selecting either the video data received by the tuner unit 202 or the video data sent from the video camera 100, and displaying the selected video data on the display unit 205.

The menu button is used for instructing the CPU 201 to display or not display the menu screen of the television 200. The menu screen of the television 200 includes a menu screen used for controlling the television 200 and a menu screen used for changing setting of the television 200. These menu screens are stored in the ROM 207.

In displaying the menu screen, the CPU 201 reads out the menu screen to be displayed from the ROM 207 and supplies the menu screen that has been read out to the display unit 205. At this time, the CPU 201 superposes the cursor on the menu screen. The display unit 205 superposes the menu screen supplied from the CPU 201 on video data supplied from the tuner unit 202 or the communication unit 203. In this way, a menu screen of the television 200 is displayed on the display unit 205. If the menu screen is not to be displayed, the CPU 201 stops supplying the menu screen to the display unit 205.

The + button and the − button are used for moving the cursor on the menu screen. The SET button is used for instructing the CPU 201 to execute the item selected by the cursor. The + button, the − button, and the SET button are also used in changing the menu screens.

If a menu screen of the video camera 100 is displayed on the television 200, the + button, the − button, and the SET button can be used for operating the cursor on the menu screen. In this case, a CEC command that corresponds to the operation of the + button, the − button, and the SET button are sent from the television 200 to the video camera 100 via the CEC line 302.

Further, the remote control unit 208 includes a second power button, a playback button, a stop button, a pause button, a fast forward button, a rewind button, a start/stop button, and a menu button. These buttons are used for operating the video camera 100.

The second power button is used for instructing the CPU 201 to send the power on command or the power off command to the video camera 100 via the CEC line 302. The power on command is a CEC command used for instructing the CPU 101 that the video camera 100 is to be changed to the power on state. The power off command is a CEC command used for instructing the CPU 101 that the video camera 100 is to be changed to the power off state.

The playback button, the stop button, and the pause button are buttons used for instructing the CPU 201 to send the playback command, the stop command, and the pause command to the video camera 100 via the CEC line 302. Further, the fast forward button and the rewind button are buttons used for instructing the CPU 201 to send the fast forward command and the rewind command to the video camera 100 via the CEC line 302. These commands are the CEC commands used for instructing the CPU 101 to execute playback, stop, pause, fast forward, and rewind of the video data recorded in the recording medium.

The start/stop button is used for instructing the CPU 201 to send the record command or the record pause command to the video camera 100 via the CEC line 302. The record command is a CEC command used for instructing the CPU 101 to start recording the video data generated by the image capture unit 111 in the recording medium. The record pause command is a CEC command used for instructing the CPU 101 to temporarily stop the recording of the video data generated by the image capture unit 111 in the recording medium.

The menu button is used for instructing the CPU 201 to send a menu on command or a menu off command to the video camera 100 via the CEC line 302.

The menu on command is a CEC command used for instructing the CPU 101 to display the menu screen of the video camera 100. If the menu screen is to be displayed, the CPU 101 reads out the menu screen to be displayed from the ROM 112 and supplies the menu screen that has been read out to the display unit 108 and the data processing unit 106. At this time, the CPU 101 superposes the cursor on the menu screen. The display unit 108 and the data processing unit 106 superposes the menu screen supplied from the CPU 101 on the video data supplied from the image capture unit 111 or the recording unit 103. In this way, a same menu screen is displayed on the display unit 108 and the television 200.

The menu off command is a CEC command used for instructing the CPU 101 not to display the menu screen of the video camera 100. If the menu screen is not to be displayed, the CPU 101 stops supplying the menu screen to the display unit 108 and the data processing unit 106. In this way, the television 200 can stop the display of the menu screen of the video camera 100.

The external apparatus 200 is not limited to a television receiving apparatus and, for example, the external apparatus 200 can be a personal computer including a display.

Next, process executed by the video camera 100 when the operation mode of the video camera 100 is changed will be described referring to FIGS. 1, 2, and 3. The video camera 100 is connected to the television 200 via the HDMI cable 300.

Figure 3:
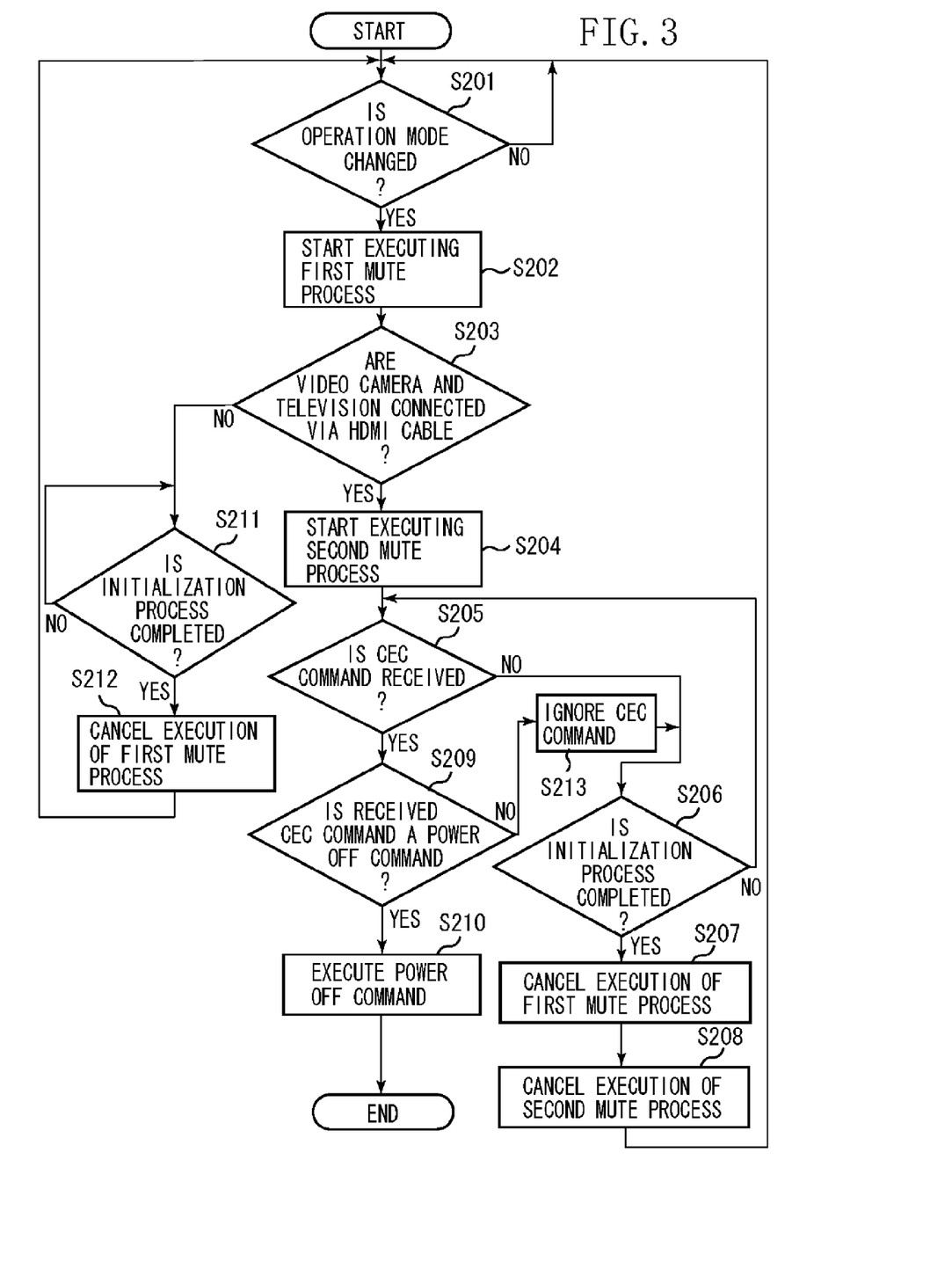
FIG. 3 is a flowchart illustrating an example of process executed by a communication apparatus according to the first exemplary embodiment of the present invention.

FIG. 3 is a flowchart illustrating process executed by the video camera 100 when the operation mode of the video camera 100, which is connected to the television 200 via the HDMI cable 300, is changed. The process illustrated in the flowchart in FIG. 3 is controlled by the CPU 101 executing a computer executable program stored in the ROM 112.

In step S201, the CPU 101 determines whether the operation mode of the video camera 100 is changed. The operation mode of the video camera 100 is changed to the image capture mode or the playback mode when the user operates the mode change button 110 of the operation unit 109.

If the operation mode of the video camera 100 is changed (YES in step S201), the process proceeds to step S202. If the operation mode of the video camera 100 is not changed (NO in step S201), then the process returns to step S201.

In step S202, the CPU 101 starts initialization process corresponding to the changed operation mode and starts executing the first mute process. The initialization process started in step S202 includes various process necessary in appropriately operating the video camera 100 in accordance with the changed operation mode.

According to the first exemplary embodiment, the first mute process is process for placing the display unit 108 in the mute state. When the display unit 108 is in the mute state, the CPU 101 displays the mute image stored in the ROM 112 on the display unit 108. If the execution of the first mute process is started, the CPU 101 continues to display the mute image on the display unit 108 until the execution of the first mute process is canceled in step S207 or step S212.

After the execution of the first mute process is started in step S202, the process proceeds to step S203.

In step S203, the CPU 101 determines whether the video camera 100 and the television 200 are connected via the HDMI cable 300.

If the CPU 101 determines that the video camera 100 and the television 200 are connected via the HDMI cable 300 (YES in step S203), the process proceeds to step S204. If the CPU 101 determines that the video camera 100 and the television 200 are not connected via the HDMI cable 300 (NO in step S203), then the process proceeds to step S211.

In step S204, the CPU 101 starts execution of the second mute process.

According to the first exemplary embodiment, the second mute process is process for placing the television 200 in the mute state by sending the mute instruction from the mute unit 105 to the television 200 via the TMDS line 301. If the execution of the second mute process is started, the CPU 101 controls the mute unit 105 so that the mute instruction is continuously transmitted to the television 200 until the execution of the second mute process is canceled in step S208. In this case, the CPU 101 controls the data processing unit 106 and the communication unit 104 so that the mute image and silent data stored in the ROM 112 are continuously transmitted to the television 200 until the execution of the second mute process is cancelled in step S208. The mute image and the silent data stored in the ROM 112 are transmitted to the television 200 via the TMDS line 301.

While receiving the mute instruction from the video camera 100, the television 200 displays the mute image stored in the ROM 207 on the display unit 205. Further, while receiving the mute instruction from the video camera 100, the television 200 mutes the sound output from the speaker unit (not shown). In this way, while the second mute process is being executed, the television 200 executes the mute process as does the video camera 100.

Not only the mute instruction the but also mute image and the silent data are sent to the television 200 because the television 200 can be an apparatus incapable of executing the mute instruction. If the television 200 is incapable of executing the mute instruction, the television 200 displays the mute image received from the video camera 100 on the display unit 205. Further, in this case, the television 200 outputs the silent data received from the video camera 100 from the speaker unit (not shown).

After the execution of the second mute process is started in step S204, the process proceeds to step S205.

In step S205, the CPU 101 determines whether the CEC command used for controlling the video camera 100 is received from the television 200. The CEC command used for controlling the video camera 100 is transmitted from the television 200 to the video camera 100 via the CEC line 302. When the communication unit 104 receives the CEC command used for controlling the video camera 100 from the television 200, the communication unit 104 supplies the CEC command to the command processing unit 107. The command processing unit 107 supplies the CEC command supplied from the communication unit 104 to the CPU 101. In this way, the CPU 101 can determine whether the CEC command used for controlling the video camera 100 and sent from the television 200 is received.

If the CPU 101 receives the CEC command for controlling the video camera 100 from the television 200 (YES in step S205), then the process proceeds to step S209. If the CPU 101 does not receive the CEC command for controlling the video camera 100 from the television 200 (NO in step S205), then the process proceeds to step S206.

In step S206, the CPU 101 determines whether the initialization process is completed. If the CPU 101 determines that the initialization process is completed (YES in step S206), then the process proceeds to step S207. If the CPU 101 determines that the initialization process is not yet completed (NO in step S206), then the process returns to step S205.

In step S207, the CPU 101 cancels the execution of the first mute process. If the execution of the first mute process is canceled, the process of displaying the mute image on the display unit 108 ends. If the current operation mode is the image capture mode, the CPU 101 displays the video data generated by the image capture unit 111 on the display unit 108 when the execution of the first mute process is canceled. If the current operation mode is the playback mode, the CPU 101 instructs the display unit 108 to display the menu screen used for selecting the video data recorded in the recording medium when the execution of the first mute process is canceled.

When the execution of the first mute process is canceled in step S207, the process proceeds to step S208.

In step S208, the CPU 101 cancels the execution of the second mute process. If the execution of the second mute process is canceled, a "mute period" ends. The mute period is a period in which the mute image is displayed on the display unit 108 and on the display unit 205 of the television 200. If the execution of the second mute process is canceled, the CPU 101 ends the mute instruction and the process of sending the mute image and the silent data to the television 200. Then, the CPU 101 starts the process of sending the same video data as the one displayed on the display unit 108 to the television 200.

As a result, the same video image is displayed on the display unit 108 and the television 200.

When the execution of the second mute process is canceled in step S208, the process returns to step S201.

In step S209, the CPU 101 determines whether the CEC command received in step S205 is a power off command.

If the CEC command received in step S205 is not the power off command (NO in step S209), then the process proceeds to step S213. If the CEC command received in step S205 is determined as the power off command (YES in step S209), then the process proceeds to step S210.

In step S213, the CPU 101 does not execute the CEC command received in step S205 and ignores the CEC command. In this way, even if the CPU 101 receives a CEC command other than the power off command from the television 200 during the initialization process, the CEC command is not executed.

When the CEC command received in step S205 is ignored in step S213, the process returns to step S206.

In step S210, the CPU 101 executes the power off command. In this way, the state of the video camera 100 is changed to the power off state. After then, the process ends.

In step S211, the CPU 101 determines whether the initialization process is completed. If the CPU 101 determines that the initialization process is completed (YES in step S211), the process proceeds to step S212. If the CPU 101 determines that the initialization process is not yet completed (NO in step S211), then step S211 is repeated.

In step S212, the CPU 101 cancels the execution of the first mute process. If the execution of the first mute process is cancelled, process of displaying the mute image on the display unit 108 ends. If the current operation mode is the image capture mode, when the execution of the first mute process is cancelled, the CPU 101 displays the video data generated by the image capture unit 111 on the display unit 108. If the current operation mode is the playback mode, when the execution of the first mute process is cancelled, the CPU 101 displays the menu screen used for selecting the video data recorded in the recording medium on the display unit 108.

When the execution of the first mute process is cancelled in step S212, the process returns to step S201.

In this way, the video camera 100 in accordance with the first exemplary embodiment can be configured not to execute a CEC command other than the power off command until a certain period of time passes from when the operation mode is changed even if the remote control unit 208 is operated. In this way, while the display unit 108 and the television 200 display the mute image, a problem that may occur due to the execution of the CEC command other than the power off command by the video camera 100 can be prevented. As a result, the operating state of the video camera 100 matches the user intended operating state, and accordingly, misuse can be prevented and operability can be improved. Further, since possibility of an unexpected operation can be reduced, the possibility of the user being confused can also be reduced.

Further, since the video camera 100 cancels the first and the second mute process after the initialization process is completed according to the first exemplary embodiment, distorted video is not displayed on either the display unit 108 or the display unit 205.

Further, according to the first exemplary embodiment, the image capture mode and the playback mode of the video camera 100 are described as examples of the operation mode, however, the modes are not limited to such modes. For example, the image capture mode can be replaced with a moving image capture mode for capturing a moving image or a still image capture mode for capturing a still image. Similarly, the playback mode can be replaced with a moving image playback mode for reproducing a moving image or a still image playback mode for reproducing a still image.

Next, referring to FIGS. 1, 2, and 4, the process of the video camera 100 that is executed when the state of the video camera 100 which is connected to the television 200 via the HDMI cable 300 is changed to a power on state will be described.

Figure 4:
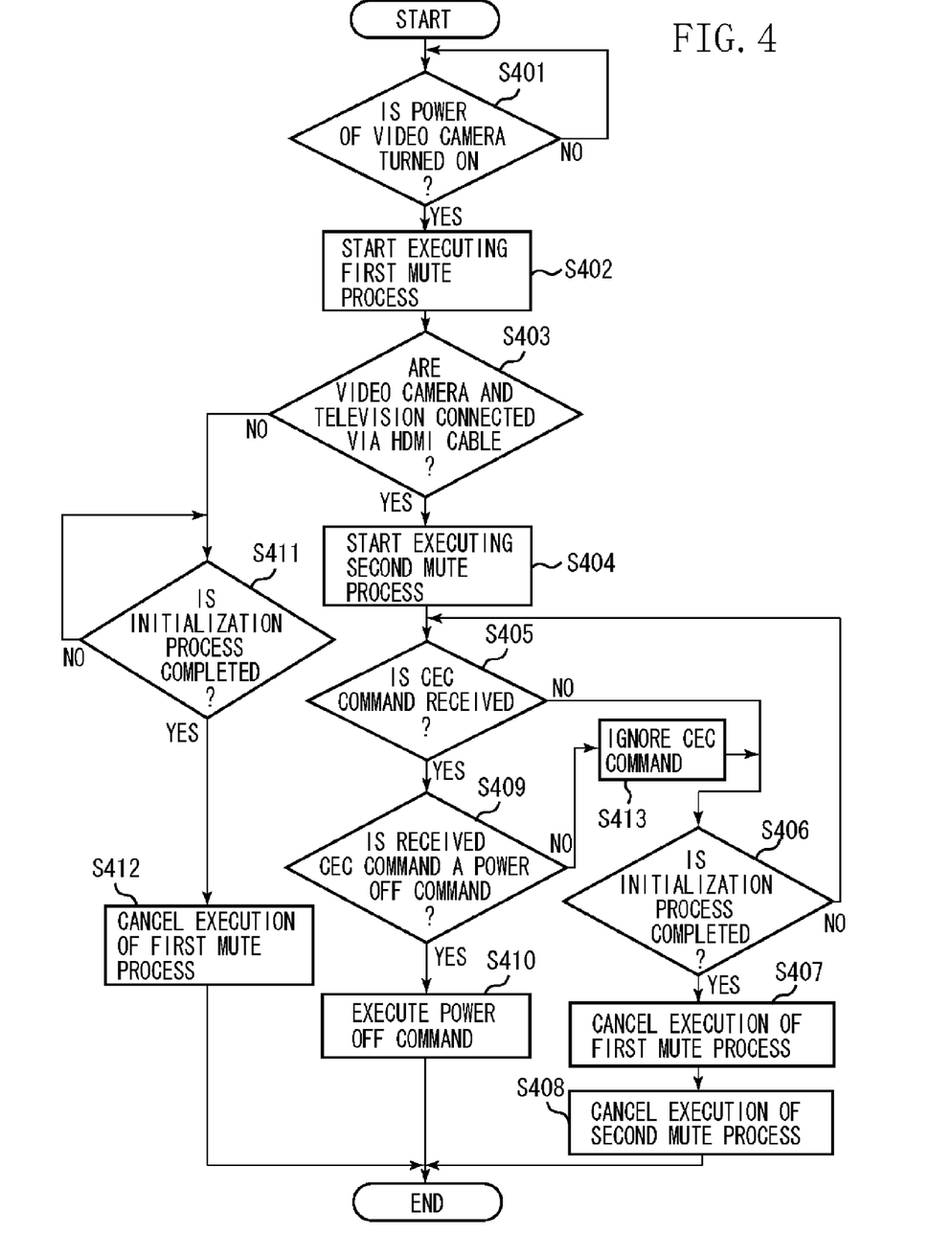
FIG. 4 is a flowchart illustrating an example of process executed by the communication apparatus according to the first exemplary embodiment of the present invention.

FIG. 4 is a flowchart illustrating process executed by the video camera 100 when the mode of the video camera 100, which is connected to the television 200 via the HDMI cable 300, is changed to the power on mode. The process illustrated in the flowchart in FIG. 4 is controlled by the CPU 101 executing a computer executable program stored in the ROM 112.

In step S401, the CPU 101 determines whether the video camera 100 is changed to the power on state when the user operates the power button of the operation unit 109.

If the video camera 100 is changed to the power on state (YES in step S401), then the process proceeds to step S402. If the video camera 100 is not changed to the power on state (NO in step S401), then the process returns to step 401.

In step S402, the CPU 101 starts the initialization process corresponding to the current operation mode and starts executing the first mute process. The initialization process started in step S402 includes various process necessary in appropriately operating the video camera 100 in accordance with the current operation mode.

If the execution of the first mute process is started, the CPU 101 continues to display the mute image on the display unit 108 until the execution of the first mute process is canceled in step S407 or step S412.

After the execution of the first mute process is started in step S402, the process proceeds to step S403. In step S403, the CPU 101 determines whether the video camera 100 and the television 200 are connected via the HDMI cable 300.

If the CPU 101 determines that the video camera 100 and the television 200 are connected via the HDMI cable 300 (YES in step S403), the process proceeds to step S404. If the CPU 101 determines that the video camera 100 and the television 200 are not connected via the HDMI cable 300 (NO in step S403), then the process proceeds to step S411.

In step S404, the CPU 101 starts execution of the second mute process. If the execution of the second mute process is started, the CPU 101 controls the mute unit 105 so that the mute instruction is continuously transmitted to the television 200 from the video camera 100 until the execution of the second mute process is canceled in step S408. Further, if the execution of the second mute process is started, the CPU 101 controls the data processing unit 106 and the communication unit 104 so that the mute image stored in the ROM 112 is continuously transmitted to the television 200 via the TMDS line 301 until the execution of the second mute process is cancelled in step S408. At this time, the silent data stored in the ROM 112 is transmitted to the television 200 together with the mute data.

If the television 200 receives the mute instruction from the video camera 100, the television 200 displays the mute image stored in the ROM 207 on the display unit 205 for a predetermined period of time. Further, in this case, the television 200 mutes the sound output from the speaker unit (not shown) for a predetermined period of time. In this way, while the second mute process is being executed, the television 200 executes the mute process as does the video camera 100.

Not only the mute instruction but also the mute image and the silent data are sent to the television 200 because television 200 can be an apparatus which cannot process the mute instruction. If the television 200 is cannot process the mute instruction, the television 200 displays the mute image received from the video camera 100 via the TMDS line 301 on the display unit 205. Further, in this case, the television 200 outputs the silent data received from the video camera 100 via the TMDS line 301 from the speaker unit (not shown).

After the execution of the second mute process is started in step S404, the process proceeds to step S405.

In step S405, the CPU 101 determines whether the CEC command used for controlling the video camera 100 is received from the television 200. The CEC command used for controlling the video camera 100 is transmitted from the television 200 to the video camera 100 via the CEC line 302. When the communication unit 104 receives the CEC command used for controlling the video camera 100 from the television 200, the communication unit 104 supplies the CEC command to the command processing unit 107. The command processing unit 107 supplies the CEC command supplied from the communication unit 104 to the CPU 101. In this way, the CPU 101 can determine whether the CEC command used for controlling the video camera 100 and sent from the television 200 is received.

If the CPU 101 receives the CEC command for controlling the video camera 100 from the television 200 (YES in step S405), then the process proceeds to step S409. If the CPU 101 does not receive the CEC command for controlling the video camera 100 from the television 200 (NO in step S405), then the process proceeds to step S406.

In step S406, the CPU 101 determines whether the initialization process is completed. If the CPU 101 determines that the initialization process is completed (YES in step S406), then the process proceeds to step S407. If the CPU 101 determines that the initialization process is not yet completed (NO in step S406), then the process returns to S405.

In step S407, the CPU 101 cancels the execution of the first mute process. If the execution of the first mute process is canceled, the process of displaying the mute image on the display unit 108 ends. If the current operation mode is the image capture mode, the CPU 101 displays the video data generated by the image capture unit 111 on the display unit 108 when the execution of the first mute process is canceled. If the current operation mode is the playback mode, the CPU 101 instructs the display unit 108 to display the menu screen used for selecting the video data recorded in the recording medium when the execution of the first mute process is canceled.

When the execution of the first mute process is canceled in step S407, the process proceeds to step S408. In step S408, the CPU 101 cancels the execution of the second mute process. If the execution of the second mute process is canceled, a "mute period" ends. The mute period is a period in which the mute image is displayed on the display unit 108 and on the television 200. If the execution of the second mute process is canceled, the CPU 101 ends the mute instruction and the process of sending the mute image and the silent data to the television 200. Then, the CPU 101 starts the process of sending the same video data as the one displayed on the display unit 108 to the television 200. As a result, the same video image is displayed on the display unit 108 and the television 200 in the mute period.

When the execution of the second mute process is canceled in step S408, the process ends.

In step S409, the CPU 101 determines whether the CEC command received in step S405 is a power off command.

If the CEC command received in step S405 is not the power off command (NO in step S409), then the process proceeds to step S413. If the CEC command received in step S405 is determined as the power off command (YES in step S409), then the process proceeds to step S410.

In step S413, the CPU 101 does not execute the CEC command received in step S405 and ignores the CEC command. In this way, even if the CPU 101 receives a CEC command other than the power off command from the television 200 during the initialization process, the CEC command is not executed.

When the CEC command received in step S405 is ignored in step S413, the process proceeds to step S406.

In step S410, the CPU 101 executes the power off command. In this way, the state of the video camera 100 is changed to the power off state. After then, the process ends.

In step S411, the CPU 101 determines whether the initialization process is completed.

If the CPU 101 determines that the initialization process is completed (YES in step S411), the process proceeds to step S412. If the CPU 101 determines that the initialization process is not yet completed (NO in step S411), then step S411 is repeated.

In step S412, the CPU 101 cancels the execution of the first mute process. If the execution of the first mute process is cancelled, process of displaying the mute image on the display unit 108 ends. If the current operation mode is the image capture mode, when the execution of the first mute process is cancelled, the CPU 101 displays the video data generated by the image capture unit 111 on the display unit 108. If the current operation mode is the playback mode, when the execution of the first mute process is cancelled, the CPU 101 displays the menu screen used for selecting the video data recorded in the recording medium on the display unit 108.

The process ends when the execution of the first mute process is cancelled in step S412.

In this way, the video camera 100 according to the first exemplary embodiment can be configured not to execute a CEC command other than the power off command until a certain period of time passes from when the power of the video camera 100 is turned on even if the remote control unit 208 is operated. In this way, while the display unit 108 and the television 200 are displaying the mute image, a problem that may occur due to the execution of the CEC command other than the power off command by the video camera 100 can be prevented. As a result, the operating state of the video camera 100 matches an operating state intended by the user, and accordingly, misuse can be prevented and operability can be improved. Further, since possibility of an unexpected operation can be reduced, the possibility of the user being confused can also be reduced.

Further, since the video camera 100 cancels the first and the second mute process after the initialization process is completed according to the first exemplary embodiment, distorted video is not displayed on either the display unit 108 or the television 200.

Second Embodiment

Figure 5:
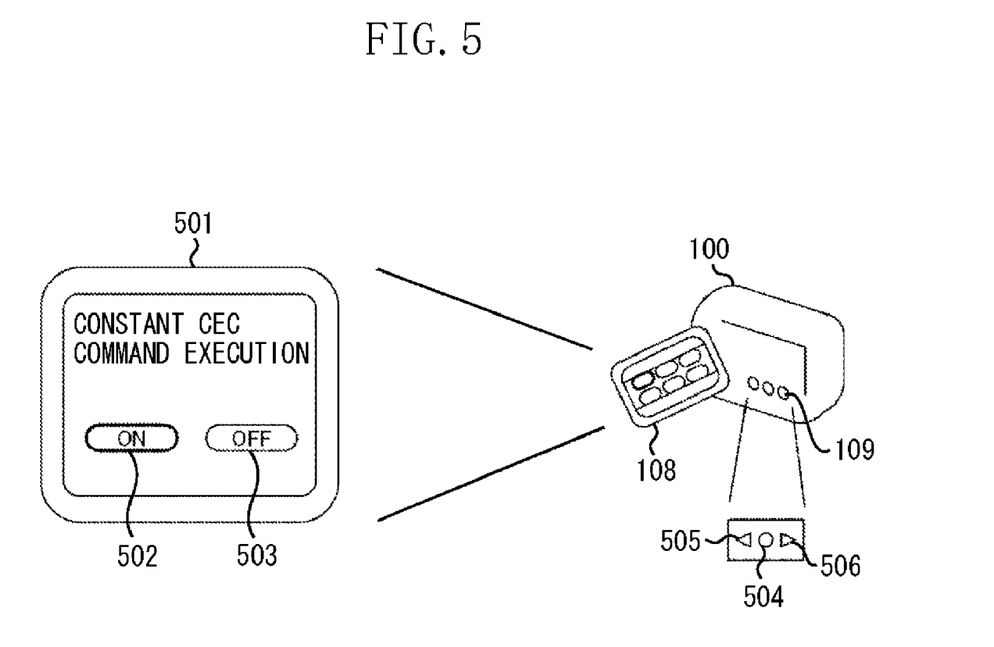
FIG. 5 illustrates an example of a menu screen displayed on the communication apparatus.

Next, a second exemplary embodiment of the present invention will be described referring to FIG. 5. In the second exemplary embodiment, description of components similar to those of the first exemplary embodiment will be omitted and only the components different from the first exemplary embodiment will be described.

A selection screen 501 is one of the menu screens displayed on the display unit 108, and stored in the ROM 112. The selection screen 501 is displayed on the display unit 108 when the user operates the operation unit 109. The user can select whether to make the video camera 100 execute the process described in the first exemplary embodiment or different process by operating the selection screen 501.

The selection screen 501 includes an ON button 502 and an OFF button 503. When the user operates the + button 506 or the – button 505 of the operation unit 109, the ON button 502 or the OFF button 503 is selected by the cursor of the selection screen 501. The – button 505 is used for moving the cursor on the selection screen 501 to the left, whereas the + button 506 is used for moving the cursor on the selection screen 501 to the right.

If the user presses the SET button 504 while the ON button 502 is selected by the cursor, the CPU 101 turns on a constant CEC command execution function. If the constant CEC command execution function is turned on, the CPU 101 stores a flag indicating that the constant CEC command execution function is turned on in the RAM 102. If the constant CEC command execution function is turned on, even if the first mute process and the second mute process is being executed, the video camera 100 can execute a CEC command other than the power off command. In other words, if the constant CEC command execution function is turned on, the video camera 100 executes process different from the one described in the first exemplary embodiment.

If the user presses the SET button 504 while the OFF button 503 is selected by the cursor, the CPU 101 turns off the constant CEC command execution function. If the constant CEC command execution function is turned off, the CPU 101 stores a flag indicating that the constant CEC command execution function is turned off in the RAM 102. If the constant CEC command execution function is turned off, the video camera 100 does not execute a CEC command other than the power off command when the first mute process and the second mute process are being executed. In other words, if the constant CEC command execution function is turned off, the video camera 100 executes the process described in the first exemplary embodiment.

In this way, according to the second exemplary embodiment, the user can select whether to make the video camera 100 execute the process described in the first exemplary embodiment.

The communication apparatus according to the present invention is not limited to the communication apparatus described in the first and the second exemplary embodiments. For example, the communication apparatus 100 according to the present invention can be a system including a plurality of apparatuses.

Further, various functions and process described in the first and the second exemplary embodiments can be realized by a computer (including a CPU) which executes a computer executable program. In this case, the computer executable program realizes the various functions described in the first and the second exemplary embodiments.

The computer executable program according to the present invention can realize the various functions and process described in the first and the second exemplary embodiments using an operating system (OS) running on the computer.

The computer executable program according to the present invention is read out from a computer readable recording medium and executed by the computer. The computer readable recording medium is, for example, a hard disk, an optical disk, a CD-ROM, a CD-R, a memory card, and a ROM. Further, the computer executable program according to the present invention can be supplied from an external apparatus to the computer via a communication interface, and executed by the computer.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

What is claimed is:

1. An electronic device comprising:
a receiving unit that receives a command from an external apparatus; and
a control unit that performs a predetermined process, wherein the predetermined process includes a process relating to a command received from the external apparatus, the predetermined process is not performed even if a command is transmitted from the external apparatus until predetermined time elapses if the electronic device is changed from a first state to a second state, and the second state is different from the first state,
wherein the predetermined process does not include a process for controlling a power source of the electronic device.

2. The electronic device according to claim 1, wherein the control unit performs a process for transmitting predetermined data to the external apparatus after time elapses if the electronic device is changed from the first state to the second state, the time is longer than the predetermined time, and the predetermined data includes at least one of video data and audio data.

3. The electronic device according to claim 1, wherein the predetermined process is performed after time elapses if the electronic device is changed from the first state to the second state, and the time is longer than the predetermined time.

4. The electronic device according to claim 1, wherein the predetermined process includes at least one of a playback process, a stop process, a pause process, a fast forward process, and a rewind process.

5. The electronic device according to claim 1, wherein the predetermined process includes at least one of a record process and a record pause process.

6. The electronic device according to claim 1, wherein the second state includes a state that the electronic device can perform a process relating to a generation of an image.

7. The electronic device according to claim 1, wherein the second state includes a state that the electronic device can perform a process relating to a playback.

8. The electronic device according to claim 1, further comprising a transmitting unit that transmits at least one of video data and audio data to the external apparatus, wherein the second state includes a state that the transmitting unit is supplied power.

9. The electronic device according to claim 1, wherein the electronic device includes one of a video camera, a still camera, and a cellular phone.

10. The electronic device according to claim 1, wherein the receiving unit can receive a command from the external apparatus even if video data is transmitted to the external apparatus from the electronic device.

11. The electronic device according to claim 1, further comprising a memory that stores EDID (Extended Display Identification Data) obtained from the external apparatus.

12. The electronic device according to claim 1, wherein the process for controlling the power source of the electronic device includes a process for stopping to supply power to a part of the electronic device.

13. A method for controlling an electronic device, the method comprising:
performing a predetermined process, wherein the predetermined process includes a process relating to a command received from an external apparatus; and
controlling not to perform the predetermined process even if a command is transmitted from the external apparatus until predetermined time elapses if the electronic device is changed from a first state to a second state, wherein the second state is different from the first state,
wherein the predetermined process does not include a process for controlling a power source of the electronic device.

14. The method according to claim 13, the further comprising:
performing the predetermined process after time elapses if the electronic device is changed from the first state to the second state, wherein the time is longer than the predetermined time.

15. The method according to claim 13, the further comprising:
performing a process for transmitting predetermined data to the external apparatus after time elapses if the electronic device is changed from the first state to the second state, wherein the time is longer than the predetermined time, and the predetermined data includes at least one of video data and audio data.

16. The method according to claim 13, wherein the predetermined process includes at least one of a playback process, a stop process, a pause process, a fast forward process, and a rewind process.

17. The method according to claim 13, wherein the predetermined process includes at least one of a record process and a record pause process.

18. The method according to claim 13, wherein the second state includes a state that the electronic device can perform a process relating to a generation of an image.

19. The method according to claim 13, wherein the second state includes a state that the electronic device can perform a process relating to a playback.

20. The method according to claim 13, wherein the second state includes a state that the electronic device can perform a process for transmitting at least one of video data and audio data to the external apparatus.

21. The method according to claim 13, wherein the process for controlling the power source of the electronic device includes a process for stopping to supply power to a part of the electronic device.

22. A non-transitory computer-readable recording medium storing a program executed by a computer, wherein the program for using the computer to perform a method, the method comprising:
performing a predetermined process, wherein the predetermined process includes a process relating to a command received from an external apparatus; and
controlling not to perform the predetermined process even if a command is transmitted from the external apparatus until predetermined time elapses if an electronic device is changed from a first state to a second state, and the second state is different from the first state,
wherein the predetermined process does not include a process for controlling a power source of the electronic device.

23. An electronic device comprising:
a receiving unit that receives a command from an external apparatus; and
a control unit that performs a predetermined process after a predetermined command is received from the external apparatus, wherein the control unit does not perform the predetermined process until predetermined time elapses after the predetermined command is received from the external apparatus if the electronic device is changing from a first state to a second state, wherein the predetermined process includes a process for controlling, using the predetermined command, the electronic device, wherein the second state is different from the first state, and wherein the predetermined command is different from a command for controlling a power source of the electronic device.

24. The electronic device according to claim 23, wherein the predetermined command includes at least one of a playback command, a stop command, a pause command, a fast forward command, a rewind command, a record command, and a record pause command.

25. The electronic device according to claim 23, wherein the second state includes a state that the electronic device can perform a process relating to a generation of an image.

26. The electronic device according to claim 23, wherein the second state includes a state that the electronic device can perform a process relating to a playback.

27. The electronic device according to claim 23, wherein the second state includes a state that the electronic device can transmits at least one of video data and audio data the external apparatus.

28. The electronic device according to claim 23, wherein the command for controlling the power source of the electronic device includes a command for stopping to supply power to a part of the electronic device.

29. A method for controlling an electronic device, the method comprising:
performing a predetermined process after a predetermined command is received from an external apparatus, wherein the predetermined process includes a process for controlling, using the predetermined command, the electronic device; and
controlling not to perform the predetermined process until predetermined time elapses after the predetermined command is received from the external apparatus if the electronic device is changing from a first state to a second state, wherein the second state is different from the first state, and wherein the predetermined command is different from a command for controlling a power source of the electronic device.

30. The method according to claim 29, wherein the predetermined command includes at least one of a playback command, a stop command, a pause command, a fast forward command, a rewind command, a record command, and a record pause command.

31. The method according to claim 29, wherein the second state includes a state that the electronic device can perform a process relating to a generation of an image.

32. The method according to claim 29, wherein the second state includes a state that the electronic device can perform a process relating to a playback.

33. The method according to claim 29, wherein the second state includes a state that the electronic device can transmits at least one of video data and audio data the external apparatus.

34. The method according to claim 29, wherein the command for controlling the power source of the electronic device includes a command for stopping to supply power to a part of the electronic device.

35. A non-transitory computer-readable recording medium storing a program executed by a computer, wherein the program for using the computer to perform a method, the method comprising:
performing a predetermined process after a predetermined command is received from an external apparatus, wherein the predetermined process includes a process for controlling, using the predetermined command, the electronic device; and
controlling not to perform the predetermined process until predetermined time elapses after the predetermined command is received from the external apparatus if the electronic device is changing from a first state to a second state, wherein the second state is different from the first state, and wherein the predetermined command is different from a command for controlling a power source of the electronic device.

* * * * *